United States Patent [19]
Koelzer

[11] Patent Number: 5,947,239
[45] Date of Patent: Sep. 7, 1999

[54] CONTAMINANT-EJECTING RELAY VALVE FOR A PNEUMATIC BRAKE SYSTEM

[75] Inventor: Robert Koelzer, Kearney, Mo.

[73] Assignee: Haldex Financial Services Corporation, Kansas City, Mo.

[21] Appl. No.: 08/705,410

[22] Filed: Aug. 26, 1996

[51] Int. Cl.[6] ................................................. B60T 17/22
[52] U.S. Cl. ................................... 188/352; 137/627.5
[58] Field of Search ...................... 788/352; 303/28–61; 137/627.5, 203, 204

[56] References Cited

U.S. PATENT DOCUMENTS

| 722,837 | 3/1903 | Guillemet | 137/627.5 |
|---|---|---|---|
| 1,510,225 | 9/1924 | Howard | 137/627.5 |
| 1,761,309 | 6/1930 | Neale . | |
| 2,330,040 | 9/1943 | Fitch | 137/627.5 |
| 2,509,597 | 5/1950 | Hamilton | 137/627.5 |
| 2,545,506 | 3/1951 | Walsh . | |
| 3,834,767 | 9/1974 | Bullinger . | |
| 3,853,357 | 12/1974 | Hitzelberger . | |
| 3,967,706 | 7/1976 | King . | |
| 3,972,341 | 8/1976 | Wheless | 137/627.5 |
| 4,764,189 | 8/1988 | Yanagawa et al. . | |
| 5,031,404 | 7/1991 | Flory et al. . | |
| 5,154,204 | 10/1992 | Hatzikazakis . | |
| 5,709,246 | 1/1998 | Koelzer | 137/627.5 |

FOREIGN PATENT DOCUMENTS

| 2064388 | 1/1993 | Canada | 188/352 |
|---|---|---|---|
| 291285 | 11/1988 | European Pat. Off. | 188/352 |

*Primary Examiner*—Matthew C. Graham
*Attorney, Agent, or Firm*—St. Onge Steward Johnston & Reens LLC

[57] ABSTRACT

A contaminant-ejecting relay valve for a pneumatic brake system is disclosed. Two embodiments of the valve are disclosed: in one embodiment, the valve is actuated by pilot air pressure, which is either supply air pressure or control air pressure; in another embodiment, the valve is solenoid-actuated. In both embodiments, the valve comprises a housing enclosing a chamber; a control port in the housing in fluid communication with the chamber; an exhaust port in the housing permitting removal of contaminants from the chamber; a main piston mounted within the chamber and movable between a first position and a second position; an exhaust passage through the main piston connecting the chamber and the exhaust port in fluid communication; and a blocking member movable between an open and closed position for opening and closing the exhaust passage, such that when the blocking member is in the open position it permits pressurized air from the control port to eject contaminants from the chamber. Preferably, the main piston includes a hollow stem, and the blocking member comprises an exhaust piston slidably mounted within the hollow stem and movable between an exhaust passage open and an exhaust passage closed position. The main piston may include an inverted conical face adjacent the chamber to direct contaminants toward the exhaust passage and away from valve seals and lubricants.

13 Claims, 11 Drawing Sheets

CONTAMINANT-EJECTING RELAY VALVE FOR A PNEUMATIC BRAKE SYSTEM

FIELD OF THE INVENTION

The invention relates to a relay valve for a pneumatic brake system and, in particular, to a brake relay valve having the ability to periodically purge liquid and other contaminants from the pneumatic system.

BACKGROUND OF THE INVENTION

Pneumatic brake systems which use pressurized air to operate the service brakes and possibly also to release the parking or safety brakes are known in the art. Pneumatic systems are particularly desirable for tractor trailer combinations which are frequently connected/disconnected from one another. The pressurized air (so-called "supply pressure") is stored in a reservoir which is charged by a compressor through a series of check valves and/or including a pressure protection valve. In these pneumatic brake systems, the driver's brake pedal or other controls directs the flow of so-called "control air." The brake pedal, when applied, opens the reservoir air supply and sends control air, which generates control air pressure, to a relay valve. The relay valve, in response to the control air pressure, connects the reservoir air supply to the brake actuators, which applies mechanical force to the brakes.

In these truck systems, the pressure generated by the driver's foot on the pedal is not applied directly to the brakes; rather, it is used only to control the relay valve which in turn delivers air pressure from the reservoir to the brake actuators, applying mechanical force to the brakes. While the truck is in use, the supply air pressure remains at a high level. It may fluctuate somewhat, but it generally remains above 90 psig (pounds per square inch, gauge). When the mechanical parking brakes of the truck are needed and the pneumatic brakes are no longer needed, the brake system is normally de-pressurized and the trailer supply line air pressure drops to zero psig (or atmospheric pressure), thus applying the trailer parking brakes.

In general, pressurized air is an effective means to control the brakes; however, contaminants introduced either intentionally or accidentally can have detrimental effects on the system. For example, in cold weather, users often inject alcohol and other de-icing compounds into the air brake system to keep the brake components from freezing. Alcohol is detrimental to the valves because it removes necessary lubricants from them and may also degrade seals and hoses. Alcohol which builds up in the brake system may create a hydraulic-type system (which is a slower pressure transmitter than a dry pneumatic system) and/or vary the operating characteristics of the system due to the relative incompressibility of the liquid. Moreover, the alcohol or other contaminants build up at the relay valve because it is the last device in the control air system; this build-up hampers brake control.

Air dryers are commonly used in pneumatic brake systems to remove condensates and other contaminates prior to delivery of air to storage reservoirs and the like. But contaminates can be introduced down stream from the air dryer, thus they remain in the trailer brake system.

U.S. Pat. No. 5,154,204 to Hatzikazakis discloses a drain valve for removing moisture from these air dryers. The drain valve includes a spring which normally biases a ball against a seat thereby closing the valve. Periodically, pneumatic pressure is applied to a piston which unseats the ball and opens the valve, allowing any moisture accumulated in the air dryer to drain by the force of gravity. The '204 patent does not disclose pressurized ejection of moisture and other contaminants and the device taught is not generally usable to remove moisture which accumulates downstream in the braking system, e.g., in the relay valve.

U.S. Pat. No. 3,967,706 to King discloses a brake actuator housing having a passage through which pressurized air may pass to purge contaminants which may enter the housing due to the environment in which the brake is used. The device taught by King provides for purging contaminants from the supply side of the system; however, it does not provide for purging contaminants from within the control side of the system and thus is not effective in avoiding the above-mentioned problems.

What is desired therefore is a device which periodically purges contaminants, such as alcohol, from a pneumatic brake system and specifically from the control side of the system and/or from a relay valve in order to maintain optimal response and control of the pneumatically-controlled brake system. A device which provides for the pressurized ejection of contaminants is also desired.

SUMMARY OF THE INVENTION

Accordingly, it is an object of the present invention to provide a valve, for use with a pneumatic brake system, which is capable of ejecting contaminants, such as alcohol, which have been injected or have accumulated therein.

It is another object of the present invention to provide a valve, for use with a pneumatic brake system, which is capable of purging contaminants from a control side of the pneumatic system.

It is still another object of the present invention to provide a, valve of the above character having an exhaust passage which is periodically opened to vent contaminants from the valve.

It is still a further object of the invention to provide a valve of the above character having a movable exhaust piston, housed within a stem of the main piston, to open and close the exhaust passage.

It is yet another object of the invention to provide a valve of the above character wherein the exhaust piston is actuated by control air pressure to open the exhaust passage.

These and other objects are achieved by a contaminant-ejecting valve comprising: a housing enclosing a main chamber; a main piston movable between first and second positions; a control port in the housing in fluid communication with the main chamber for moving the main piston from the first to the second position; an exhaust port; an exhaust passage through the main piston connecting the main chamber and the exhaust port in fluid communication; and a blocking member which opens the exhaust passage under control pressure. When the exhaust passage is open, contaminants, such as alcohol, may be expelled from the chamber through the exhaust passage and to the exhaust port.

The valve also includes a supply port and a delivery port, the delivery port being in fluid communication with the supply port when the main piston is in the second position and blocked from the supply port when the main piston is in the first position. Preferably, a spring biases the main piston to the first position.

Preferably, the valve is a relay valve in a pneumatic brake system. Preferably, the blocking member is an exhaust piston mounted in a hollow stem of the main piston and the exhaust passage extends from the main chamber to the hollow stem and from there to the exhaust port.

In pneumatic embodiment of FIGS. 1–6, the blocking member is responsive to pilot air pressure provided from a pilot port in the valve to close the exhaust passage. In this embodiment, the blocking member is slidably mounted within the hollow stem to move between an exhaust passage open position and an exhaust passage closed position. It should be understood that pilot air could be either supply air or control air, as described in more detail herein.

During normal operation, i.e., when the vehicle is being driven, pressurized pilot air acts on an end of the exhaust piston and forces it to block the exhaust passageway. Pressurized control air exerts a substantially opposite (i.e., upwardly) force on the exhaust piston which is insufficient to overcome the force exerted by the pilot air pressure when the vehicle is being driven.

When the pilot air pressure is released (e.g., when the parking brake is applied), the pressurized control air acting on the exhaust piston overcomes the force of the released pilot air and moves the exhaust piston to open the exhaust passage and allow escape of control air to the exhaust port. The escaping control air expels any moisture or other contaminants that may have accumulated on the main piston, in the main chamber and/or in the control air line. The contaminants travel from the main chamber, through the exhaust passage, and out the exhaust port.

In the solenoid actuated embodiment, illustrated in FIGS. 7–11, the blocking member includes a solenoid which moves the blocking member to an exhaust passage open position. A spring biases the blocking member in the exhaust passage closed position.

The electrical signal operating the solenoid is provided by an electrical control unit (ECU). The ECU generates a solenoid-operating signal during an Automatic Braking System (ABS) event, which is typically either a wheel-lock condition or a condition during which there is a discrepancy in wheel speeds.

The invention and its particular features and advantages will become more apparent from the following detailed description when considered with reference to the accompanying drawings.

DETAILED DESCRIPTION OF THE INVENTION

Figure 1:
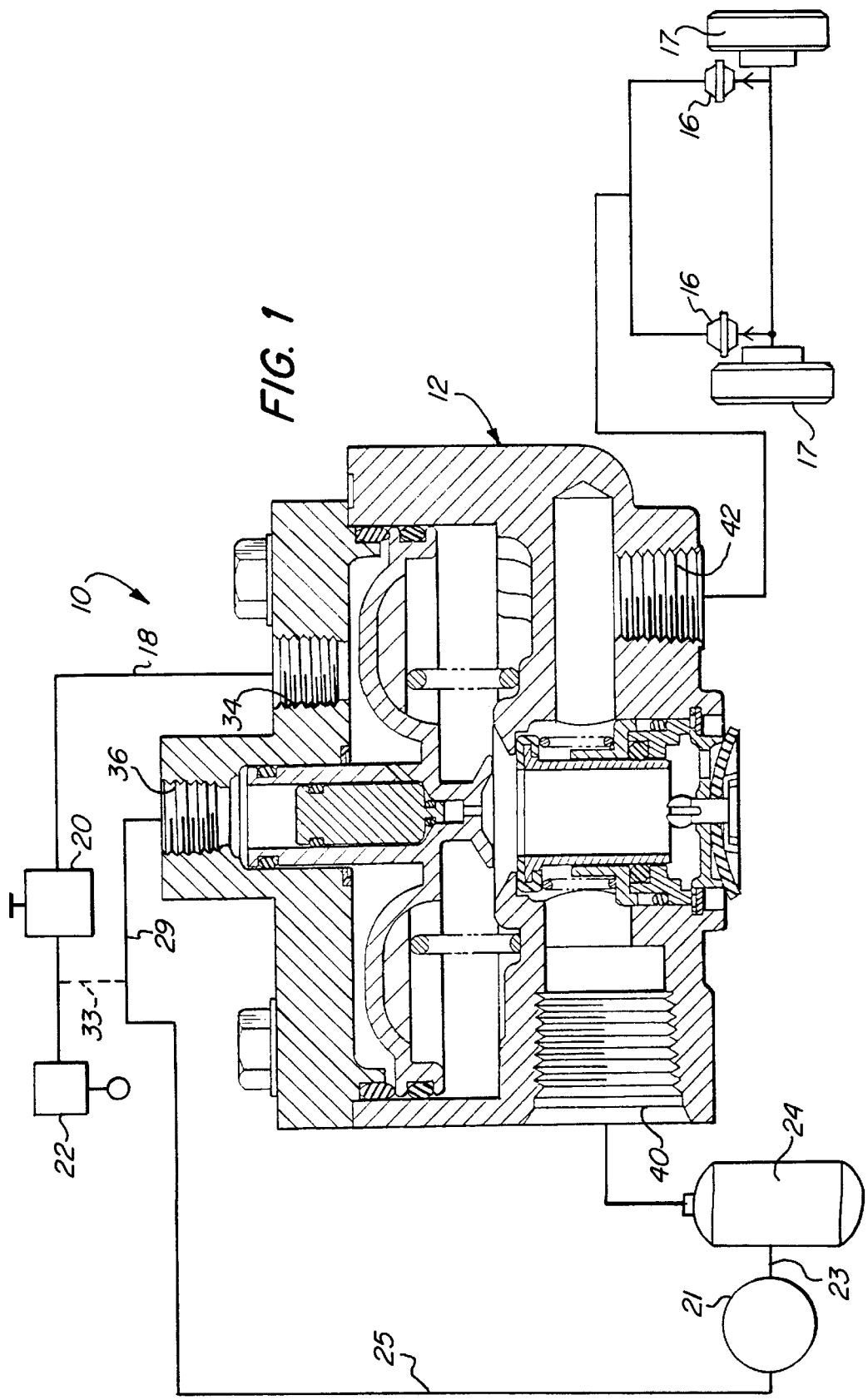
FIG. 1 is a partial schematic diagram of a brake system incorporating a pneumatic embodiment of a contaminant-ejecting relay valve constructed in accordance with the present invention, the contaminant-ejecting relay valve shown in cross-section.

Referring to the drawings in detail, a pneumatic brake system 10 comprising a brake relay valve 12, constructed in accordance with the present invention, is shown. As used in this description, the terms "up", "down", "top", "bottom", etc. refer to valve 12 when in the orientation illustrated in FIG. 1; however, it should be understood that the orientation shown is not necessary for operability.

Referring to FIGS. 1–11, two embodiments of a contaminant-ejecting relay valve are shown and designated by references numerals 12, 12A, respectively. Valve 12, shown in FIGS. 1–6 is actuated by pilot air pressure and control air pressure. Valve 12A is, in contrast, solenoid-actuated. The solenoid is activated, as discussed in more detail herein below, during an ABS event, which is typically either a wheel-lock condition or a condition during which a sensor (not shown) detects a discrepancy in wheel speeds. Each of these valves 12, 12A is discussed in more detail hereinbelow.

Referring to FIG. 1, the pneumatic brake system 10 of the invention comprises brake relay valve 12, connected between a supply air reservoir 24, carrying pressurized supply air, and brake cylinders 16. Control air line 18, carrying pressurized control air, actuates relay valve 12 to deliver pressurized supply air through supply air line 14 to brake cylinders 16 (as discussed in more detail hereinbelow), which operate on wheels 17. Pressurized control air traveling through line 18 is regulated by brake pedal 20 which is connected to a conventional compressor 22, commonly known in the art. Supply air line 14 is connected to reservoir 24 which may also be charged by a conventional compressor (not shown), commonly known in the art.

In brake system 10, supply air reservoir 24 connects to point 40 via pressurized supply air line 14; it also connects to spring brake control valve 21, commonly known in the art, via line 23. Spring brake control valve is preferably connected, via line 25, to pilot port 36.

Alternatively, pilot port 36 may, if desired, be connected via dashed line 33, to pressurized control air.

Accordingly, as desired, pilot port 36 may receive either pressurized supply air via line 25 or pressurized control air via dashed line 33. Because either pressurized supply air or control air may be received at port 36, pressurized air entering port 36 via line 29 is referred to as "pilot" air.

Figure 2:
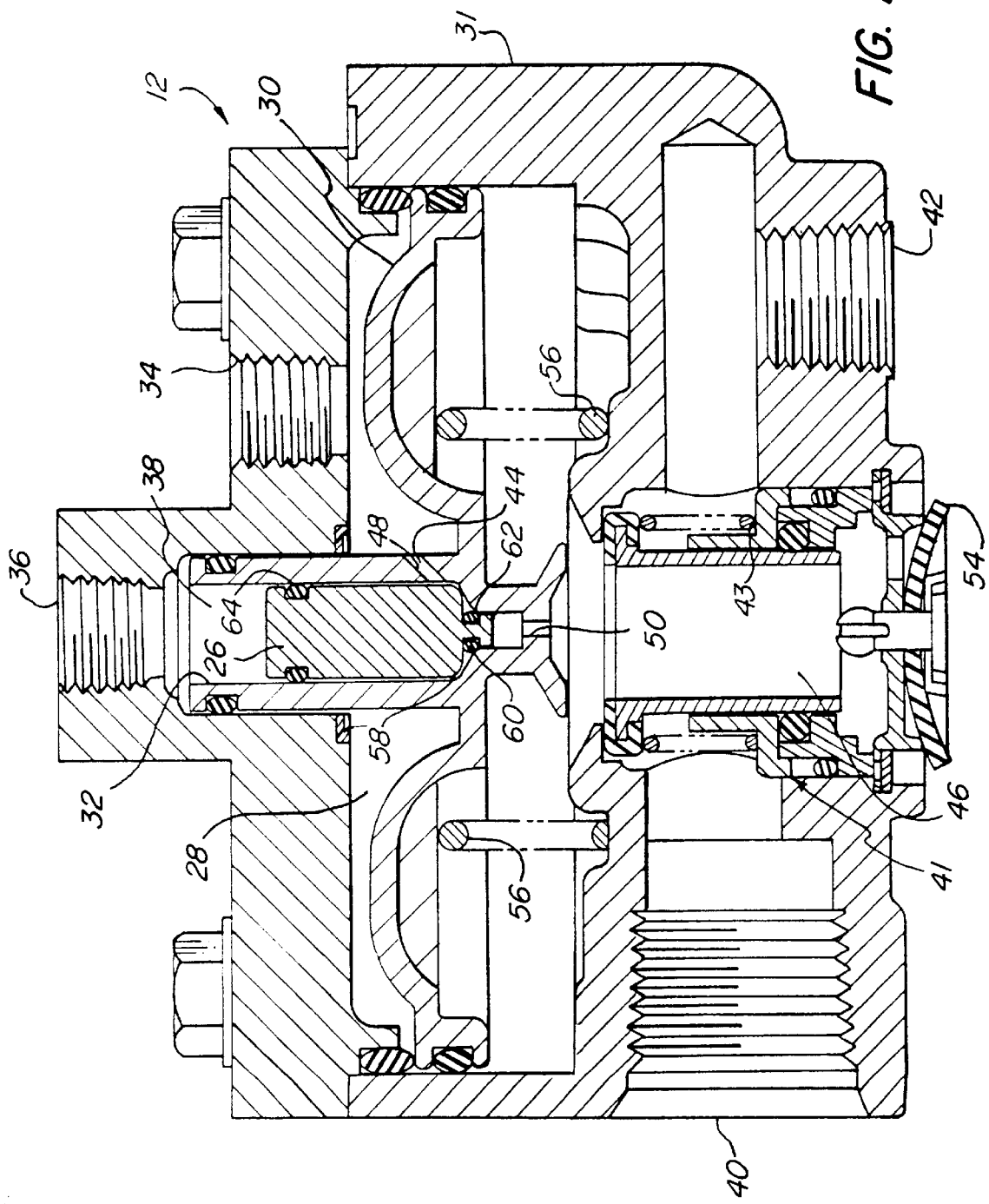
FIG. 2 is a cross-sectional view of the valve of FIG. 1, showing the position of a main and an exhaust piston during normal operation (when the brakes are not applied), i.e., when pressurized pilot air is applied but pressurized control air is not supplied.

Referring to FIG. 2, valve 12 comprises housing 31. Housing 31 has a control port 34 in fluid communication with the main piston chamber 28 for allowing the passage of pressurized control air therethrough. Housing 31 also has pilot port 36 in fluid communication with the main piston chamber 28 for allowing the passage of pressurized pilot air therethrough; pilot port 36 is in fluid communication with exhaust piston chamber 38 for actuating exhaust piston 26. Exhaust port 35 (shown in FIG. 4) is in fluid communication with control air port 34.

Referring to FIG. 2, brake relay valve 12 comprises a main piston 30 disposed in chamber 28 of housing 31 and having hollow stem 32. Main piston 30 is spring-biased upwardly via spring 56 and movable between an uppermost and lowermost position. Main piston 30 operates to connect a reservoir- or supply-port 40 with delivery port 42 for supplying pressure to the brake cylinders 16 (FIG. 1).

Valve 12 also comprises blocking member 26 for permitting pressurized air from the control port 34 to expel or eject contaminants from the main piston chamber 28 through an exhaust passage 44. Most preferably, the blocking member comprises an exhaust piston 26 which is slidably mounted in the hollow stem 32 of main piston 30, between an exhaust passageway open (FIGS. 4-5) and closed (FIGS. 2-3) positions. Direction of the movement of exhaust piston 26 is best shown by the double-headed arrow in FIG. 5.

Figure 4:
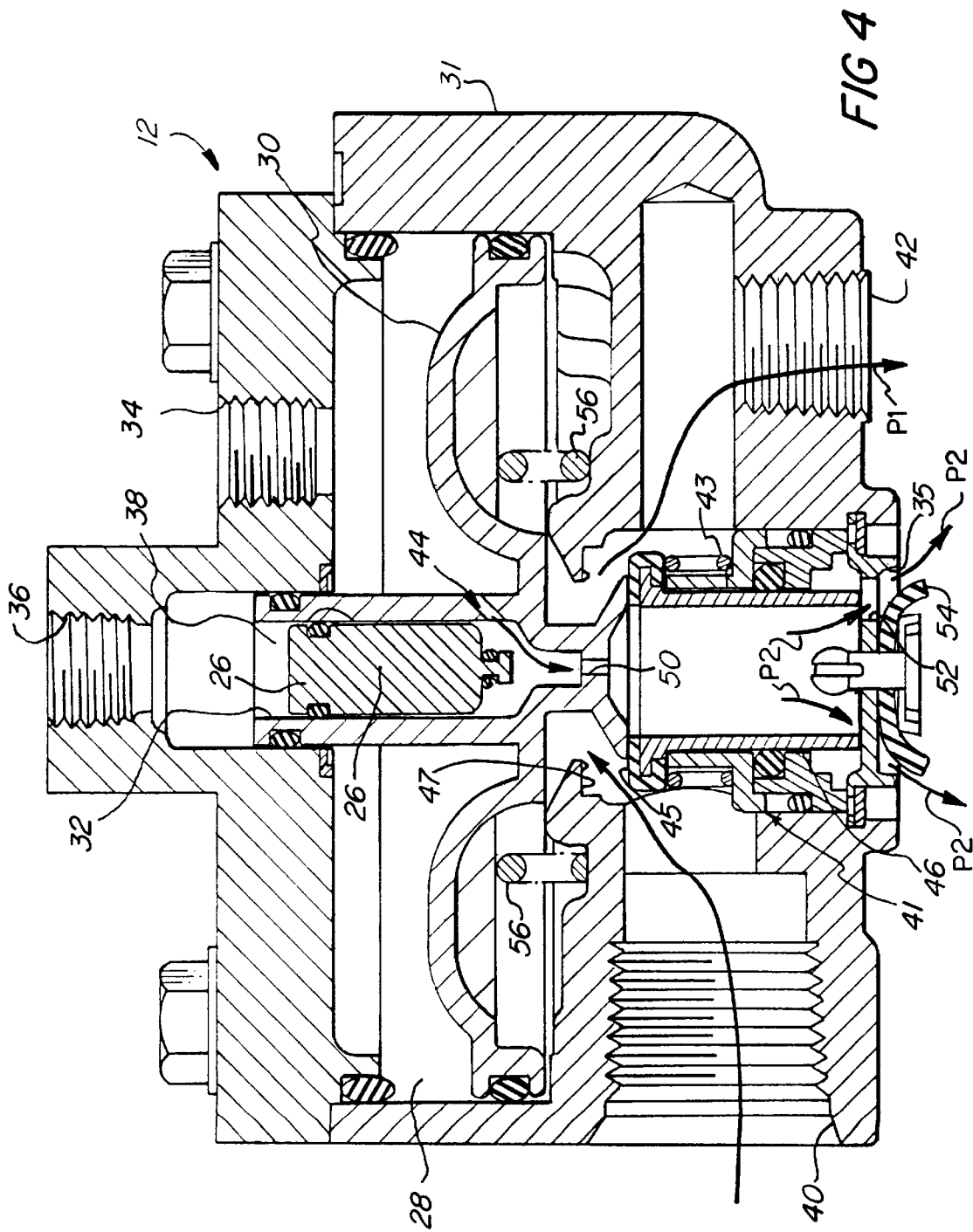
FIG. 4 is a cross-sectional view of the valve of FIG. 1 showing the position of the main and exhaust pistons during ejection of accumulated contaminants, i.e., when pressurized control air is applied and pressurized pilot air is released.

It should be understood, however, that blocking member 26 can take on any size and shape so long as it is responsive to pilot air for closing the exhaust passage 44 when pressurized pilot air is supplied through pilot port 36 and for opening the exhaust passage 44 when under the influence of control air pressure upon substantial release of pilot air to permit the expulsion of contaminants from the main piston chamber 28 through the exhaust passage 44 and to the exhaust port 35 (FIG. 4).

In the preferred embodiment, exhaust piston 26 is cylindrical in shape and preferably includes a shoulder and neck portion 58, 60, respectively (FIG. 2). Exhaust piston 26 includes two seals 62, 64 (FIG. 3), one of which 62 is located on neck portion 60. The neck portion 60 of exhaust piston 26, together with the seal 62 located thereon, blocks exhaust passageway 44 when pressurized pilot air is applied. See FIGS. 2, 3. As will be further described below, shoulder and neck portions 58, 60 of exhaust piston 26 provide surfaces over which pressurized control air acts to move exhaust piston 26.

As best shown in FIGS. 2–5, main piston 30 comprises an exhaust passageway 44 which, when open, creates a path from main piston chamber 28 to an exhaust area 46 to the exhaust port 35 (FIG. 4). In the most preferred embodiment, exhaust passageway 44 consists of three sections: a first section 48 (FIG. 2), which is comprised of a hole bored through the wall of hollow stem 32 creating a passageway between hollow stem 32 and main piston chamber 28; a second section 50, which is comprised of a hole connecting hollow stem 32 to exhaust area 46; and a third section 52 (FIG. 4), which connects exhaust area 46 to exhaust port 35 (FIG. 4). Exhaust area 46 may lead to the exhaust port 35 (or atmosphere) via, for example, a conventional leaf valve 54 as shown by the arrows along path P2.

FIG. 2 illustrates the position of relay valve 12 during normal operation of the vehicle (i.e., when the brakes are not applied). Pressurized control air through line 34 has not been applied, thus spring 56 biases main piston housing 31 in the uppermost position. Pressurized supply air has been actuated; thus the pressurized supply air acts as the pilot air and is delivered through pilot port 36 and maintains exhaust piston 26 in the lowermost position, thereby blocking exhaust passage 44 and preventing the escape of control air and any contaminants from main piston chamber 28.

During normal operation (FIG. 2), meeting surface 45 of delivery valve 41 and meeting surface 47 of main piston 30 (best shown in FIGS. 3, 4), are sealed against each other preventing supply port 40 from being in fluid communication with delivery port 42.

Figure 3:
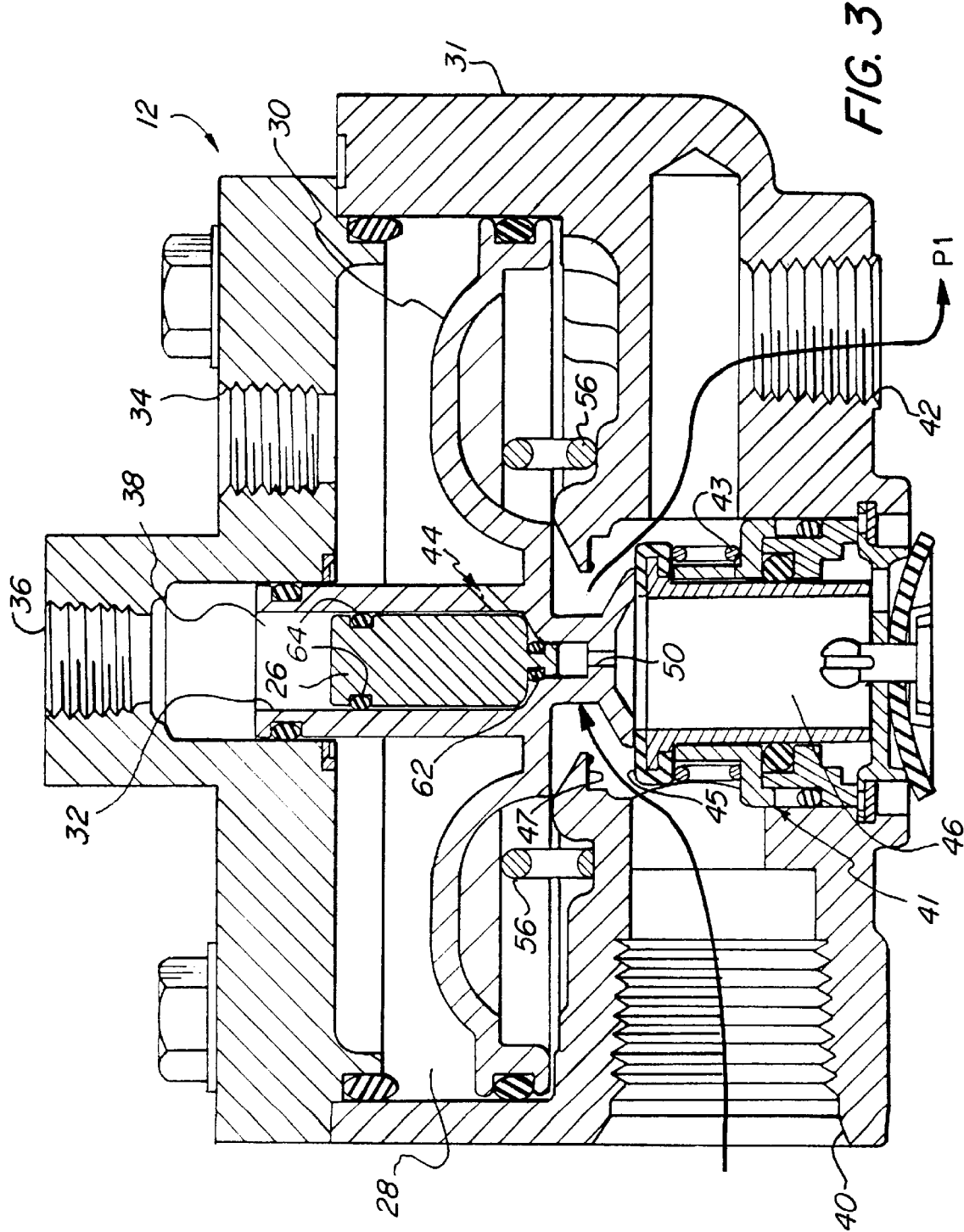
FIG. 3 is a cross-sectional view of the valve of FIG. 1 showing the position of the main and exhaust pistons during braking, i.e., when pressurized pilot air and pressurized control air are both applied.

FIG. 3 illustrates the position of the relay valve 12 during application of the brake pedal 20 (FIG. 1). Application of a user's foot to the brake pedal 20 (FIG. 1) causes pressurized control air to pass through control air line 18 (FIG. 1), causing pressurized control air to act upon main piston 30 through control air port 34. Pressurized control air urges main piston 30 downwardly, overcoming the force of spring 56, thereby connecting pressurized supply air from reservoir/supply port 40 to the brakes (not shown) through delivery port 42 via delivery valve 41 along the path indicated by P1.

Delivery valve 41 moves between a normally closed position (shown in FIGS. 1, 2, 5) and an open position (FIGS. 3-4). When open, supply port 40 is in fluid communication with delivery port 42 and pressurized supply air flows along the path indicated by P1. Delivery valve 41 is normally spring-biased to a delivery closed position via spring 43. When pressurized control air acts on or otherwise influences main piston 30 forcing it downwardly, delivery valve 41 becomes unseated, i.e., delivery valve meeting surface 45 becomes displaced from main piston housing meeting surface 47 allowing the supply port 40 and the delivery port 42 to be in fluid communication with each other and in a delivery position.

During application of the brakes, pressurized pilot air, which in this instance, would be supply air, remains high such that exhaust piston 26 moves in tandem with main piston 30 and remains fixed in relation thereto. That is, exhaust passageway 44 remains blocked by exhaust piston 26 and no control air is allowed to escape therethrough. It should be appreciated that the pressurized pilot air acting on exhaust piston 26 also serves to move the main piston 30; however, this may be compensated for by adjusting the elasticity of spring 56.

During braking, the area between seals 62, 64 of the exhaust piston 26 is pressurized by control air. Since the diameter of exhaust piston 26 through seal 62 is less than the diameter of seal 64, the pressurized control air acting on exhaust piston 26 between seals 62 and 64 urges exhaust piston 26 toward pilot port 36. Thus, due to the geometry of exhaust piston 26 and the locations of seals 62, 64, this pressurized control air exerts a force on the lower end of exhaust piston 26 which urges exhaust piston 26 upwardly and towards the exhaust passage 44 open position; however, this force is insufficient to overcome the opposing force applied to the upper end of exhaust piston 26 by pressurized pilot air. Thus, exhaust passageway 44 remains blocked while pilot air pressure is applied.

FIG. 4 depicts the position of relay valve 12 during de-pressurization of the supply line 14. In this figure, the pressurized control air remains applied (as if the brake pedal 20 were being applied) and the pilot (which, in this case, is supply air) pressure is de-pressurized (as if the parking brake were being applied). Thus, the force of the pressurized control air overcomes the force of the pressurized pilot air and moves the exhaust piston 26 upwardly thereby opening exhaust passageway 44. Some of the relatively highly-pressurized control air then escapes expelling any liquid or other contaminants accumulated in main piston chamber 28 of relay valve 12. The contaminants are expelled into exhaust area 46 and out leaf valve 54 along path P2.

Referring again to FIG. 4, it should be understood that delivery valve 41 is in the delivery open position, allowing the supply port 40 to be in fluid communication with the delivery port 42 via path P1, in the manner discussed above.

Figure 5:
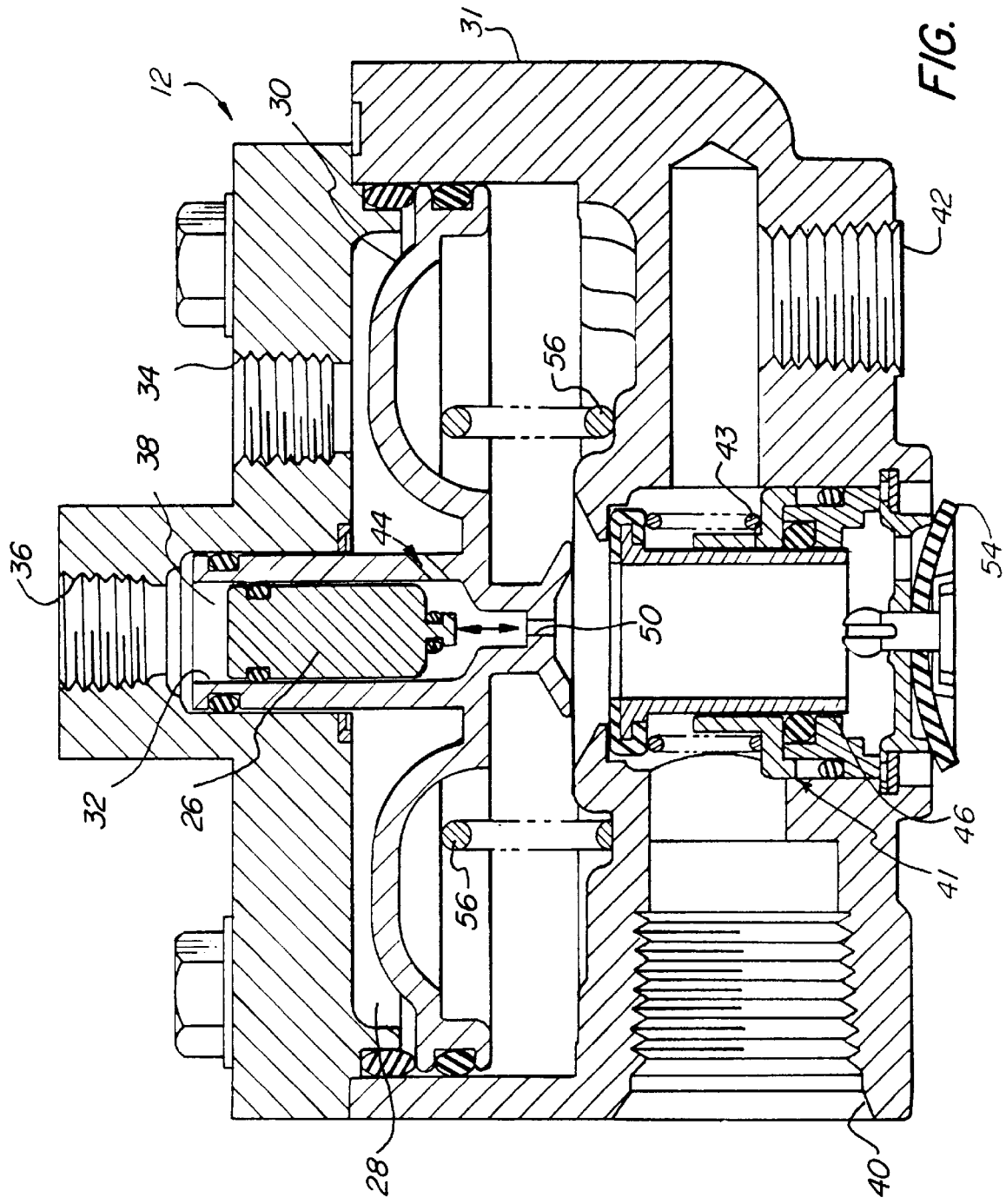
FIG. 5 is a cross-sectional view of the valve of FIG. 1 showing the position of the main and exhaust pistons after ejection and before resumption of normal operations, that is when pressurized pilot and control air are not applied.

Referring to FIG. 5, after all of the pressurized control air escapes from main piston chamber 28 and/or the all of the pressurized control air is released, i.e., when the system is at rest, spring 56 biases main piston 30 to an uppermost or rest position. Exhaust piston 26 is capable of moving freely within hollow stem 32 of main piston 30 until such time as the pressurized pilot air, i.e., supply air, is re-applied, but due to the force of gravity, exhaust piston 26 comes to rest against the floor of stem 32. When pilot pressure is re-applied, valve 12 again assumes the position depicted in FIG. 2.

While the system is at rest (FIG. 5), meeting surface 45 of delivery valve 41 and meeting surface 47 of main piston 30 (best shown in FIGS. 3, 4), are sealed against each other preventing supply port 40 from being in fluid communication with delivery port 42.

In the preferred embodiment described above, pressurized control air is utilized to move exhaust piston 26 when the pilot air line is de-pressurized; however, this may be accomplished by other means. For example, one or more springs (not shown) could be used to bias exhaust piston 26 in the open position. Thus, if the pilot air line were de-pressurized, the spring(s) would move exhaust piston 26, allowing the escape of control air from main piston chamber 28.

Figure 6:
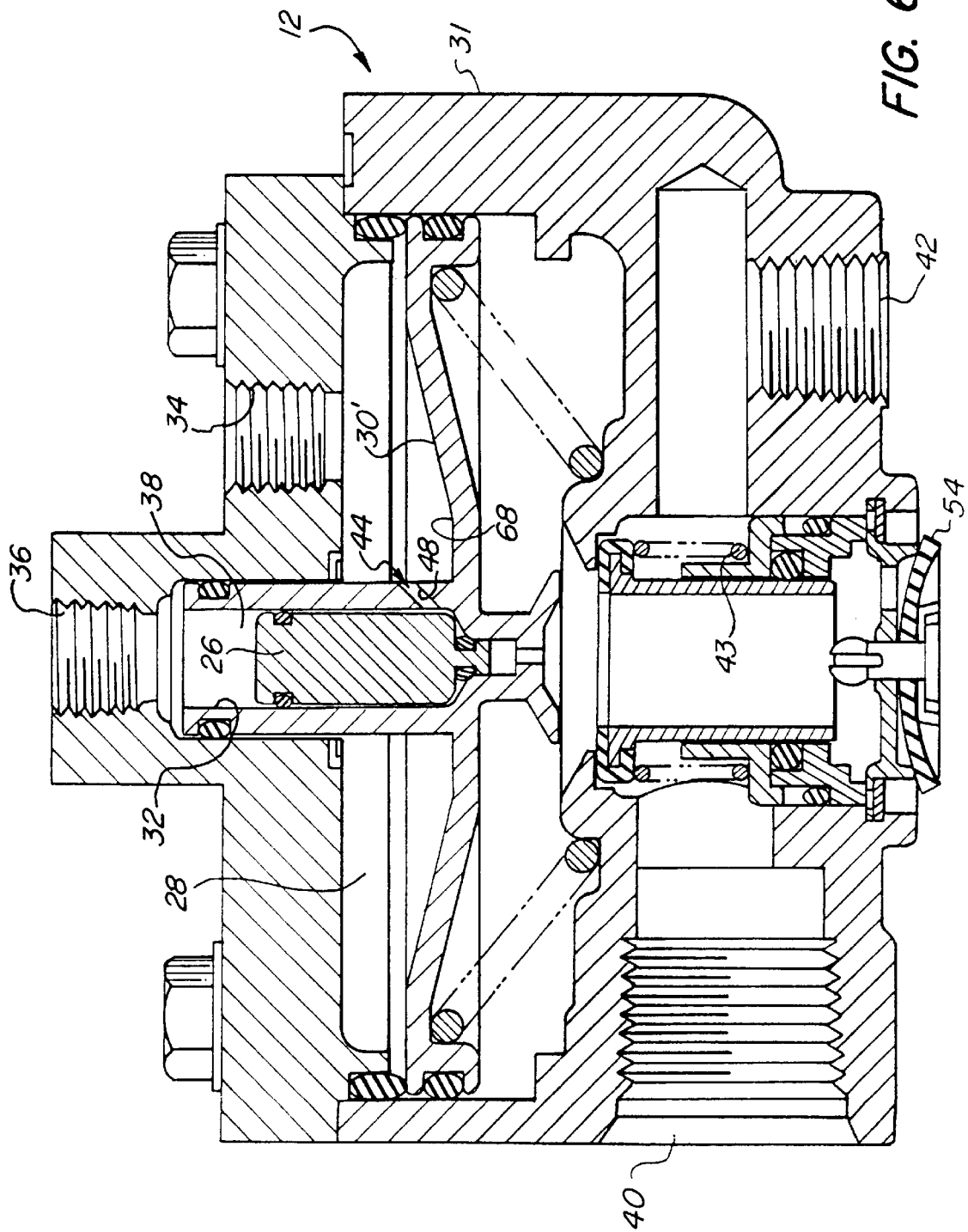
FIG. 6 is a cross-sectional view of an alternate embodiment of the valve shown in FIG. 1, showing a conically-shaped main piston.

FIG. 6 shows an alternate embodiment of valve 12, wherein like reference numerals indicate like elements. In order to aid in the expulsion of moisture and other contaminants from valve 12, main piston 30' may be conical in shape. Advantageously, the conical shape directs contaminants toward exhaust passageway 44, assisting in their expulsion, and also directs contaminants away from any valve seals and/or lubricants which are susceptible to damage thereby.

Also, the first section 48 of exhaust passageway 44, which connects hollow stem 32 to main piston chamber 28, preferably opens into main piston chamber 28 at or as close as possible to the face 68 of main piston 30'. This minimizes the amount of contaminants, if any, which is not expelled through exhaust passageway 44 when exhaust passageway 44 is opened. The conical shape at main piston 30' serves to allow the first section 48 of exhaust passageway 44 to be drilled adjacent the face 68 of main piston 30 to aid in drainage.

Referring to FIGS. 1–6 in detail, if control air via line 33 acts as the pilot air and travels over line 29 and into pilot port 36 (FIG. 1), it should be understood that care must be taken to design pilot port 36 and control port 34 such that sufficient pressure may build up through control port 34 to raise exhaust piston 26 to the exhaust open position. That is, pilot port 36 must be sufficiently small and control port 34 sufficiently large so that more pressurized air is allowed to enter port 34 than enters port 36, allowing exhaust piston 26 to be moved to the exhaust open position.

Another preferred embodiment is shown in detail in FIGS. 7–11, wherein elements similar to those shown in FIGS. 1–5 have been identified with an "A" suffix. In this preferred embodiment, valve 12A comprises a solenoid responsive to an automatic braking event, such as a wheel-lock condition, for moving the blocking member 26A between exhaust open and exhaust closed positions. Valve 12A comprises electronic control unit (ECU), shown schematically, in FIG. 11, for generating the solenoid-operating signal for operatively controlling the solenoids. A solenoid-operating signal will also be generated in the event that sensors, not shown but commonly known in the art, sense a discrepancy in wheel speeds.

Referring again to FIG. 11, the pneumatic brake system 10A comprises brake relay valve 12A, connected between a supply air line 14A, carrying pressurized supply air, and brake cylinders 16A. Pressurized control air is regulated by brake pedal 20A which is connected between a conventional compressor 22A, commonly known in the art, and chamber 79. Supply air line 14A is connected to reservoir 24A which may also be charged by a conventional compressor (not shown), commonly known in the art. Reservoir 24A is also connected via line 23A to spring brake control valve 21A. Spring brake control valve 21A is connected via line 25A to a point between compressor 22A and brake pedal 20A.

Referring to FIGS. 7–10 in detail, the solenoid-activated brake relay valve 12A comprises a comprises a housing 31A having a main piston chamber 28A. A main piston 30A, having a hollow stem 32A, is disposed inside the main piston chamber 28A and has an exhaust passage 44A therethrough. Exhaust passage 44A connects the main piston chamber 28A in fluid communication with an exhaust port 35A (best shown in FIG. 9).

Figure 8:
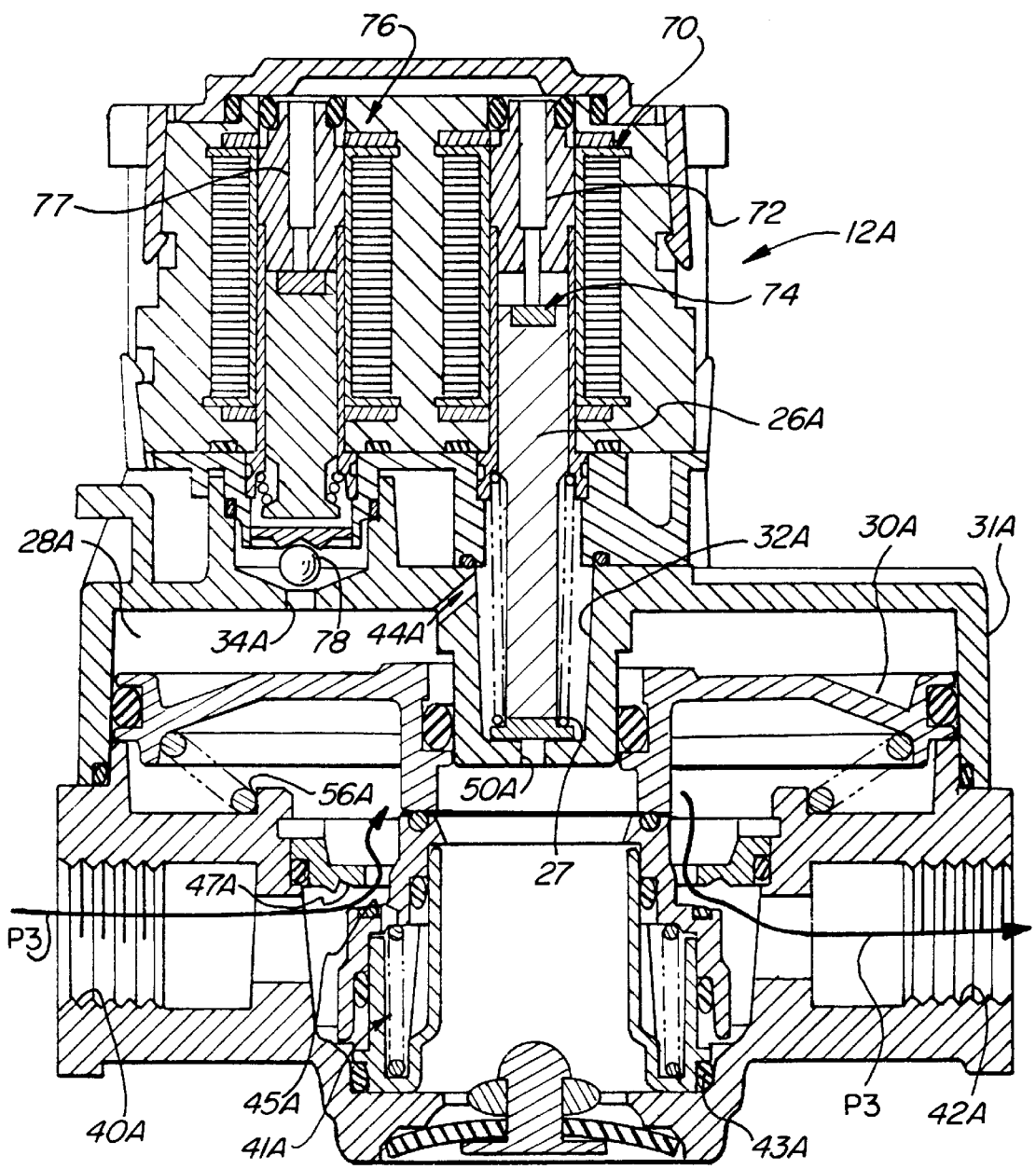
FIG. 8 is a cross-sectional view of the solenoid-activated valve shown in FIG. 7, showing the position of the main and exhaust pistons during a braking condition (similar to that shown in FIG. 3).
Figure 9:
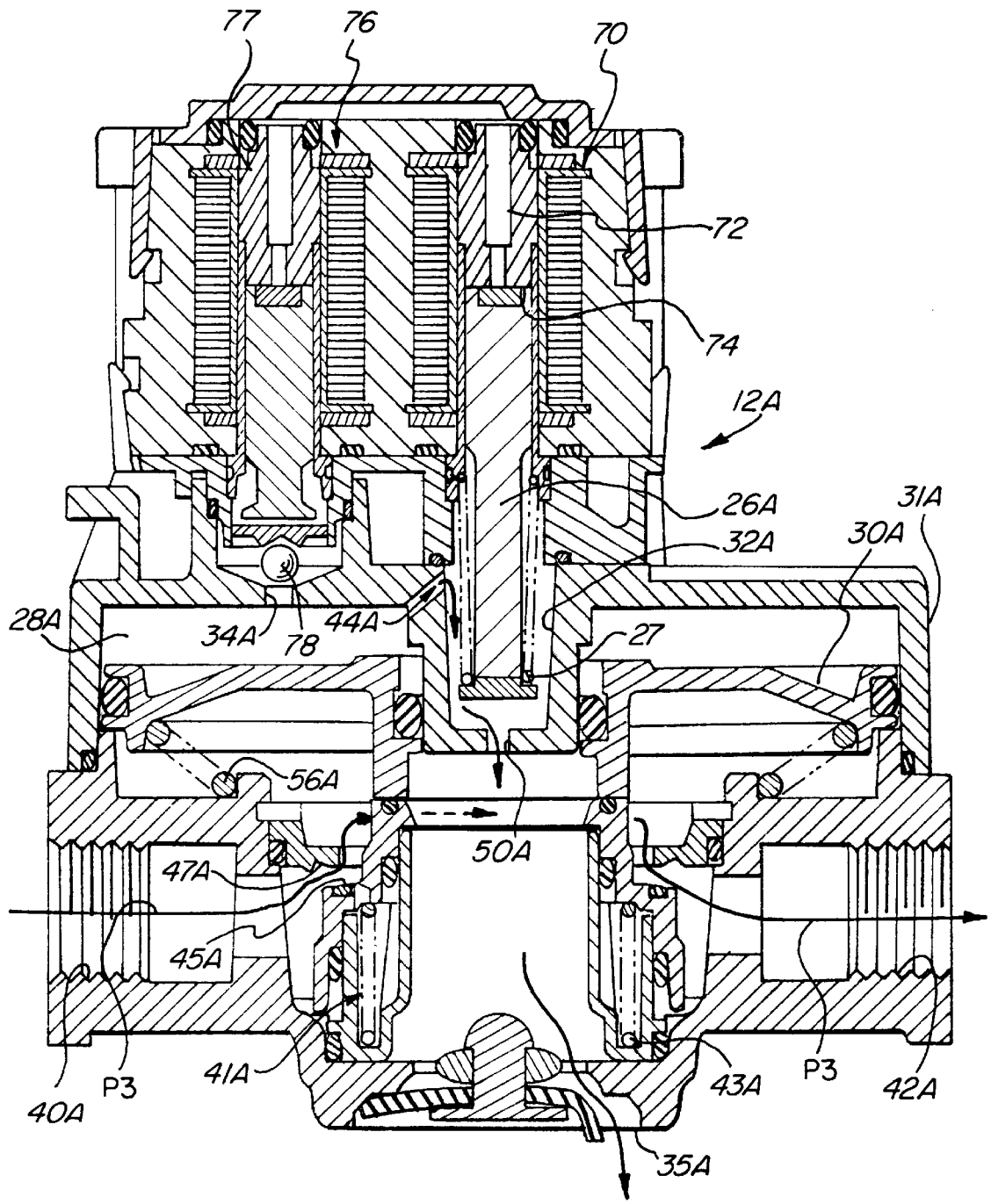
FIG. 9 is a cross-sectional view of the valve of FIG. 7 showing the position of the main and exhaust pistons during ejection of accumulated contaminants (similar to that shown in FIG. 4).

Exhaust piston 26A is slidably mounted within the hollow stem 32A of main piston 30A and is movable between an exhaust passage blocking position (FIGS. 7-8, 10) and an exhaust passage open position (FIG. 9). The exhaust piston 26A further comprises a spring 27 for biasing the exhaust piston 26A to the exhaust passage open position (FIG. 9).

Figure 7:
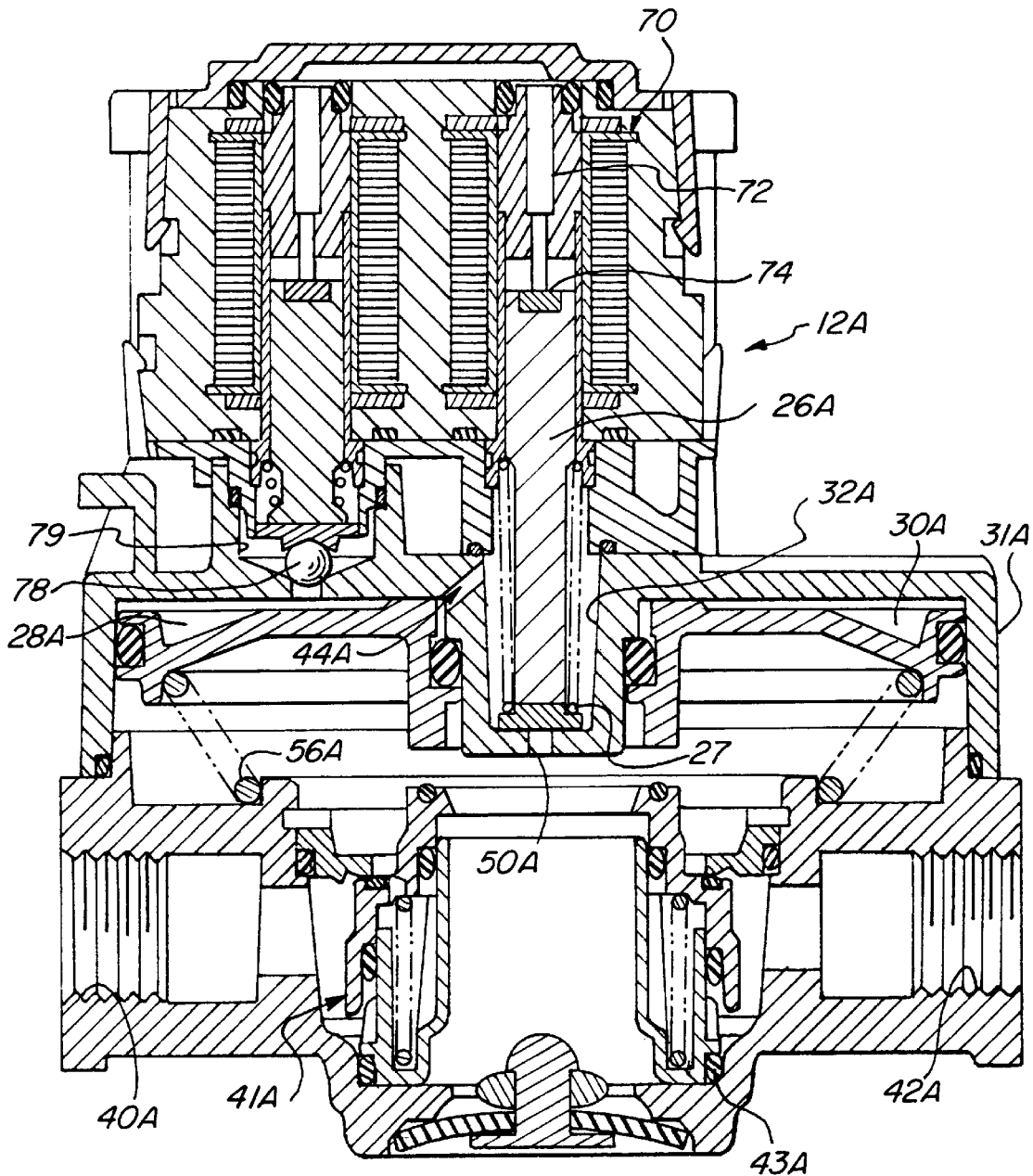
FIG. 7 is a cross-sectional view of solenoid-actuated embodiment of the valve shown in FIG. 1; more particularly, FIG. 7 corresponds to the illustration in FIG. 2, that is, it shows the position of a main and an exhaust piston when the brakes are not applied.
Figure 10:
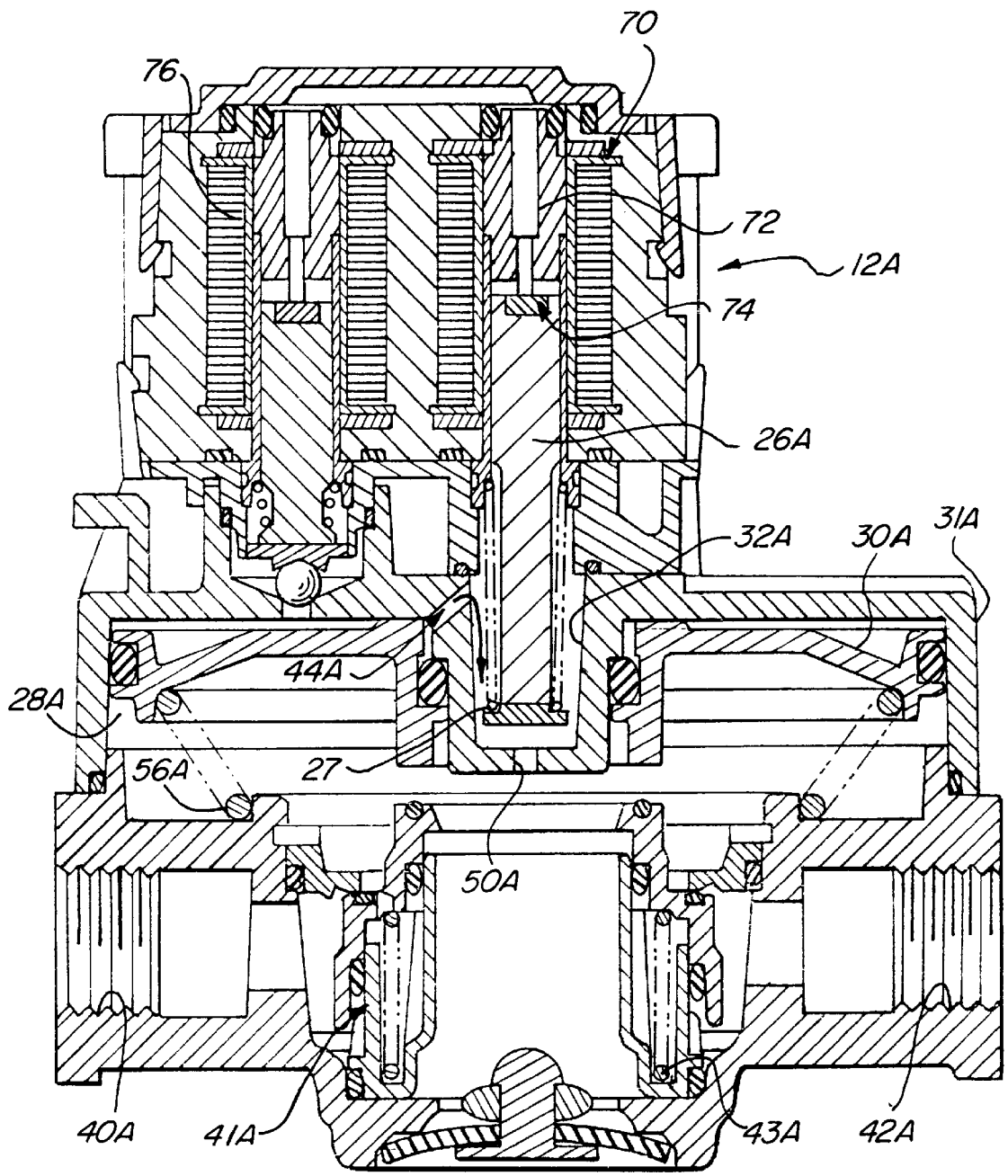
FIG. 10 is a cross-sectional view of the valve of FIG. 7 showing the position of the main and exhaust pistons when the relay valve is at rest.
Figure 11:
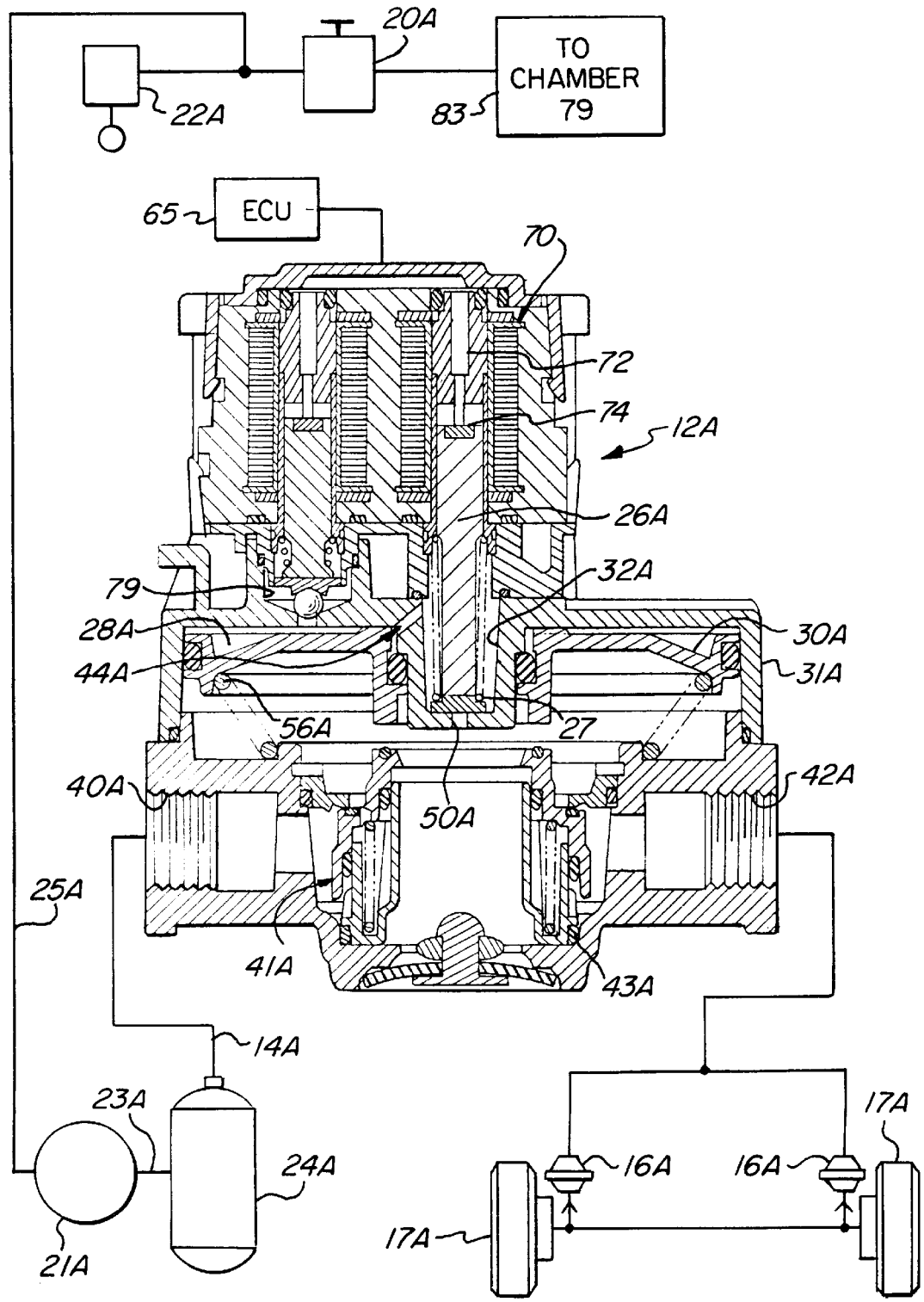
FIG. 11 is a partial schematic diagram of a brake system incorporating the solenoid-activated contaminant-ejecting relay valve shown in FIGS. 7–10, the solenoid-activated contaminant-ejecting relay valve shown in cross-section.

At least one solenoid 70, responsive to a solenoid-operating signal, which is generated during an ABS event, serves to activate exhaust piston 26A. Solenoid 70 comprises a movable armature 72, which is disposed within hollow stem 32A and is attached at one end 74 to exhaust piston 26A, by any suitable means, for moving the exhaust piston 26A between the exhaust passage open (FIG. 9) and exhaust passage blocking positions (FIGS. 7-8, 10).

An energizer, commonly known in the art, desirably energizes and deenergizes the solenoid 70. Spring 27 biases exhaust piston 26A into a lowermost or exhaust-passage closed position. When solenoid 70 is energized, armature 72 overcomes the force of spring 27 and moves the exhaust piston 26A to the exhaust passage open position (FIG. 9), allowing contaminants to pass through the exhaust passage 44A. In contrast, when solenoid 70 is de-energized, spring 27 biases exhaust piston 26A to the exhaust passage closed position (FIGS. 7-8, 10), preventing contaminants from passing through the exhaust passage 44A to exhaust port 35A (FIG. 9).

Similar to that shown in FIGS. 2–5, housing 31A further comprises a second supply port 40A for allowing the passage of supply air therethrough, and delivery port 42A, which is connected in fluid communication with the supply port 40A via delivery valve. As shown in FIGS. 7, 10, delivery valve 41A is spring-biased, via spring 43A, to a delivery closed position and movable to a delivery open position (FIGS. 8, 9) as main piston 30A moves towards the lowermost position. When the main piston 30A is in the lowermost position, the second supply port 40A and the delivery port 42A are in fluid communication with one another. When in fluid communication, pressurized supply air flows from supply port 40A to delivery port 42A along the direction shown by path P3.

FIGS. 7–10 illustrate the operation of solenoid-activated brake valve 12A. Because the operation of valve 12A is similar to the operation of valve 12, shown in FIGS. 1–5, the operation of valve 12A will only be briefly described herein.

FIG. 7 shows the operation of the solenoid-activated brake relay valve during normal driving conditions, i.e., the brake pedal 20A (FIG. 11) is not applied. Spring 56A biases piston 30A to its uppermost position. Spring 27 biases exhaust piston 26A to the exhaust passage blocking position; thus, contaminants cannot be expelled from chamber 28A. Meeting surface 45A of delivery valve 41A and meeting surface 47A (both shown in FIGS. 8, 9) of main piston 30A are sealed against each other, preventing supply port 40A from being in fluid communication with delivery port 42A.

When the brake pedal 20A (FIG. 11) is depressed, solenoid 76 raises armature 77 allowing pressurized control air shown schematically sit 83 to unseat ball 78 in chamber 79, allowing pressurized control air to enter into main piston chamber 28A and force main piston 30A to move to its lowermost position. See FIG. 8. Main piston 30A thus overcomes the force of spring 43A, allowing supply port 40A to be in fluid communication with delivery port 42A.

Referring to FIG. 9, when the parking brake is applied, solenoid 70 is energized, lifting exhaust piston 26A off of exhaust orifice 50A. Accordingly, contaminants are allowed to pass from the main piston chamber 28A, through exhaust passage 44A and to exhaust port 35A (FIG. 9, for example) along the path indicated by P4. Delivery valve 41A is in the delivery open position; thus, supply port 40A and delivery port 42A are in fluid communication with each other, as discussed before, and pressurized supply air flows along path P3.

After an ABS event, solenoid 70 closes almost immediately so as to facilitate the build-up of control air pressure in chamber 28A. Solenoid 76 closes in increments to facilitate the build-up of control air pressure in chamber 28A.

FIG. 10 illustrates relay valve 12A when it is at rest. At rest, solenoid 70 is de-energized; thus, spring 56A biases piston 30A to its lowermost position. Exhaust piston 26A is biased to an exhaust passage blocking position via spring 27.

It should be understood that blocking member 26A has been shown herein as a piston for the sake of convenience only. Blocking member 26A could take on any desirable shape so long as it desirably opened and closed the exhaust passage 44A, as desired, to expel contaminants from the main piston chamber 28A to the exhaust port 35A.

It should further be understood that the relay valve 12A could, if desired, have a conical face (similar to the valve 12 shown in FIG. 6), to direct contaminants toward the exhaust passage 44A, with obvious design modifications that would be apparent to someone skilled in the art after reading this disclosure.

Although the invention has been described with reference to a particular arrangement of parts, features and the like, these are not intended to exhaust all possible arrangements or features, and indeed many other modifications and variations will be ascertainable to those of skill in the art. Accordingly, reference should be made primarily to the accompanying claims rather than the foregoing specification to determine the scope of the invention.

What is claimed is:

1. A contaminant-ejecting valve for a pneumatic brake, comprising:

a housing enclosing a chamber;

a control port in the housing in fluid communication with the chamber;

an exhaust port in the housing permitting removal of contaminants from the chamber;

a main piston mounted within the chamber and movable between a first position and a second position, said main piston including a hollow stem;

a supply port for providing pressurized air to the valve;

a delivery port, said delivery port in a delivery position when connected in fluid communication with said supply port to provide pressurized air to the pneumatic brake when said main piston is in the second position;

an exhaust passage through said main piston connecting the chamber and said exhaust port in fluid communication; and an exhaust piston slidably mounted within the hollow stem of said main piston movable between an exhaust passage open and an exhaust passage closed position for opening and closing said exhaust passage, such that when said exhaust piston is in the open position it permits pressurized air from said control port to eject contaminants from the chamber.

2. The contaminant-ejecting valve of claim 1 wherein said main piston is moved to the second position under influence of pressurized control air.

3. The contaminant-ejecting valve of claim 2 wherein said delivery position is blocked from fluid communication with said supply port when said main piston is in the first position.

4. The contaminant-ejecting valve of claim 3 wherein said main piston is normally held in said first position by a spring.

5. A contaminant ejecting valve for a pneumatic brake, comprising:

a housing enclosing a chamber;

a pilot port in the housing;

a control port in the housing in fluid communication with the chamber;

an exhaust port in the housing permitting removal of contaminants from the chamber;

a main piston mounted within the chamber and movable between a first position and a second position;

an exhaust passage through said main piston connecting the chamber and said exhaust port in fluid communication; and a blocking member movable between an open and closed position for opening and closing said exhaust passage, such that when said blocking member is in the open position it permits pressurized air from said control port to eject contaminants from the chamber, and wherein said blocking member closes said exhaust passage in response to pressurized air from said pilot port.

6. The contaminant-ejecting valve of claim 5 wherein said blocking member opens said exhaust passage under influence of control pressure upon release of pressurized air from said pilot port.

7. A contaminant-ejecting relay valve for a pneumatic brake, comprising:

a housing enclosing a chamber;

a control port in the housing in fluid communication with the chamber;

a pilot port in said housing;

an exhaust port in the housing permitting removal of contaminants from the chamber;

a main piston mounted within the chamber and movable between a first position and a second position;

an exhaust passage through said main piston connecting the chamber and said exhaust port in fluid communication; and a blocking member movable between an open and closed position for opening and closing said exhaust passage, such that when said blocking member is in the open position it permits pressurized air from said control port to eject contaminants from the chamber, wherein said blocking member closes said exhaust passage in response to pressurized air from said pilot port, wherein said blocking member opens said exhaust passage under influence of control pressure upon release of pressurized air from said pilot port.

8. The contaminant-ejecting relay valve of claim 7, wherein said main piston includes a hollow stem, and wherein said blocking member comprises an exhaust piston slidably mounted within the hollow stem and movable between an exhaust passage open and an exhaust passage closed position.

9. The contaminant-ejecting relay valve of claim 8 wherein said main piston includes an inverted conical face adjacent the chamber to direct contaminants toward the exhaust passage and away from valve seals and lubricants.

10. The contaminant-ejecting relay valve of claim 8 wherein said housing includes a supply port for providing pressurized air to the valve, and a delivery port; said delivery port in a delivery position when connected in fluid communication with said supply port to provide pressurized air to a brake when said main piston is in the second position.

11. The contaminant-ejecting relay valve of claim 10 wherein said main piston is moved to the second position under influence of pressurized control air.

12. The contaminant-ejecting relay valve of claim 11 wherein said delivery position is blocked from fluid communication with said supply port when said main piston is in the first position.

13. The contaminant-ejecting relay valve of claim 8 wherein said main piston is normally held in said first position by a spring.

* * * * *